Aug. 18, 1925.                                                                                1,550,555
W. MAYER
TRAILER COUPLER
Filed Jan. 30, 1924                    3 Sheets-Sheet 1
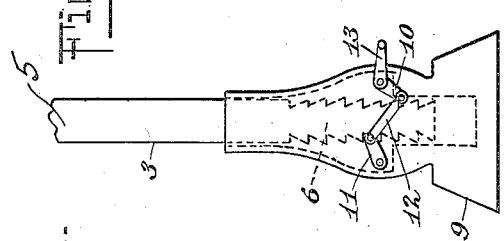
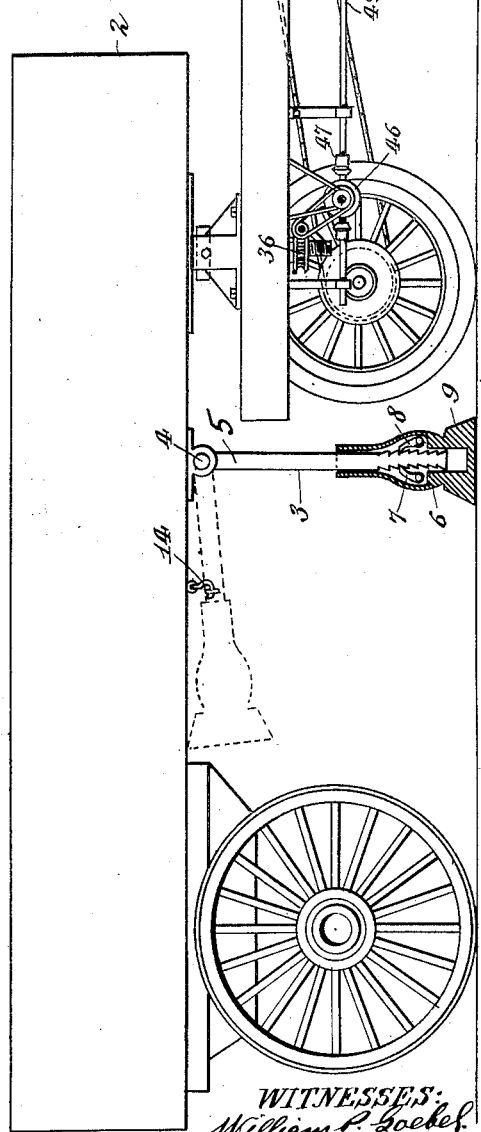
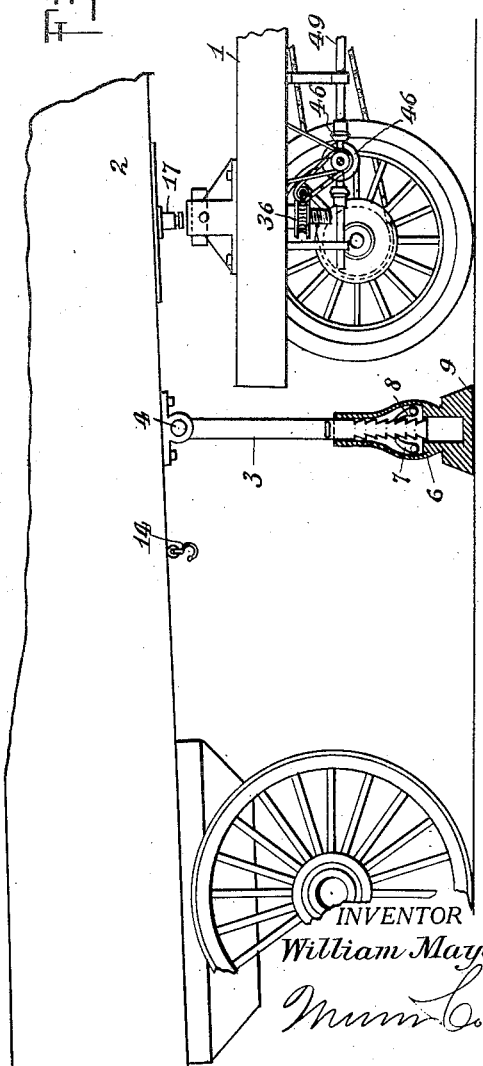
WITNESSES:
William P. Goebel
A. L. Kitchin
INVENTOR
William Mayer.
ATTORNEYS Aug. 18, 1925.
W. MAYER
1,550,555
TRAILER COUPLER
Filed Jan. 30, 1924 3 Sheets-Sheet 2
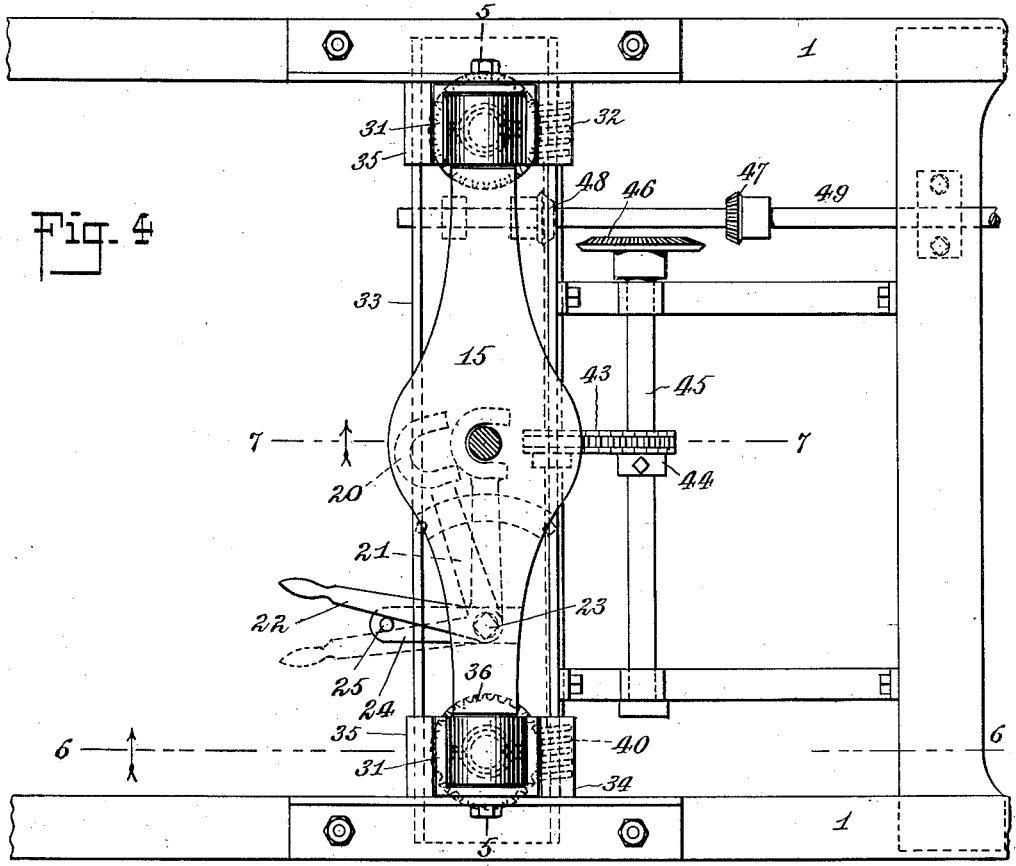
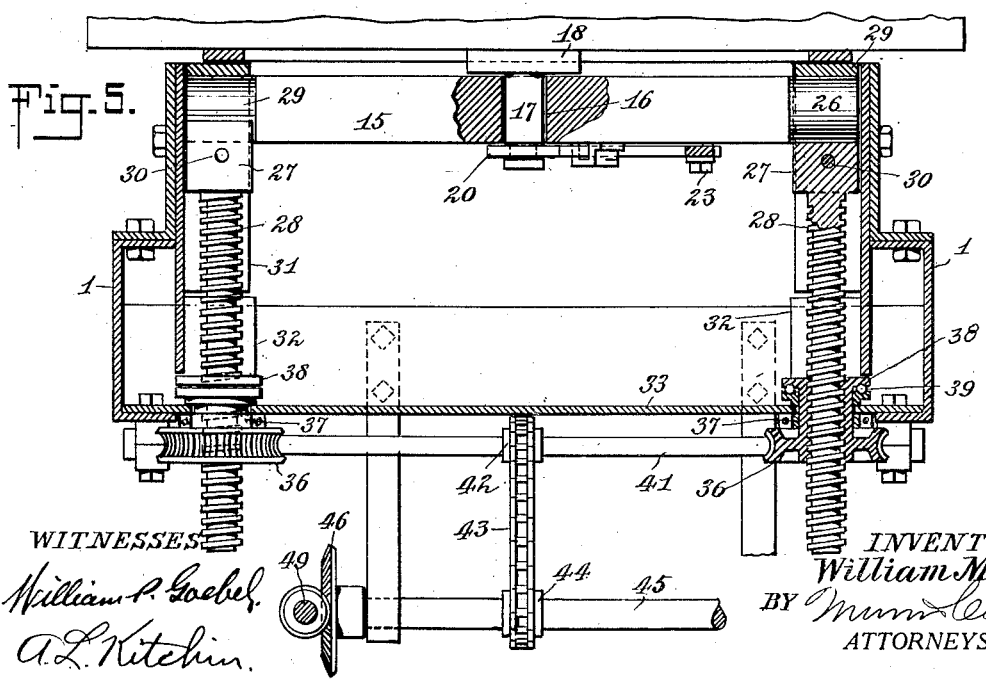

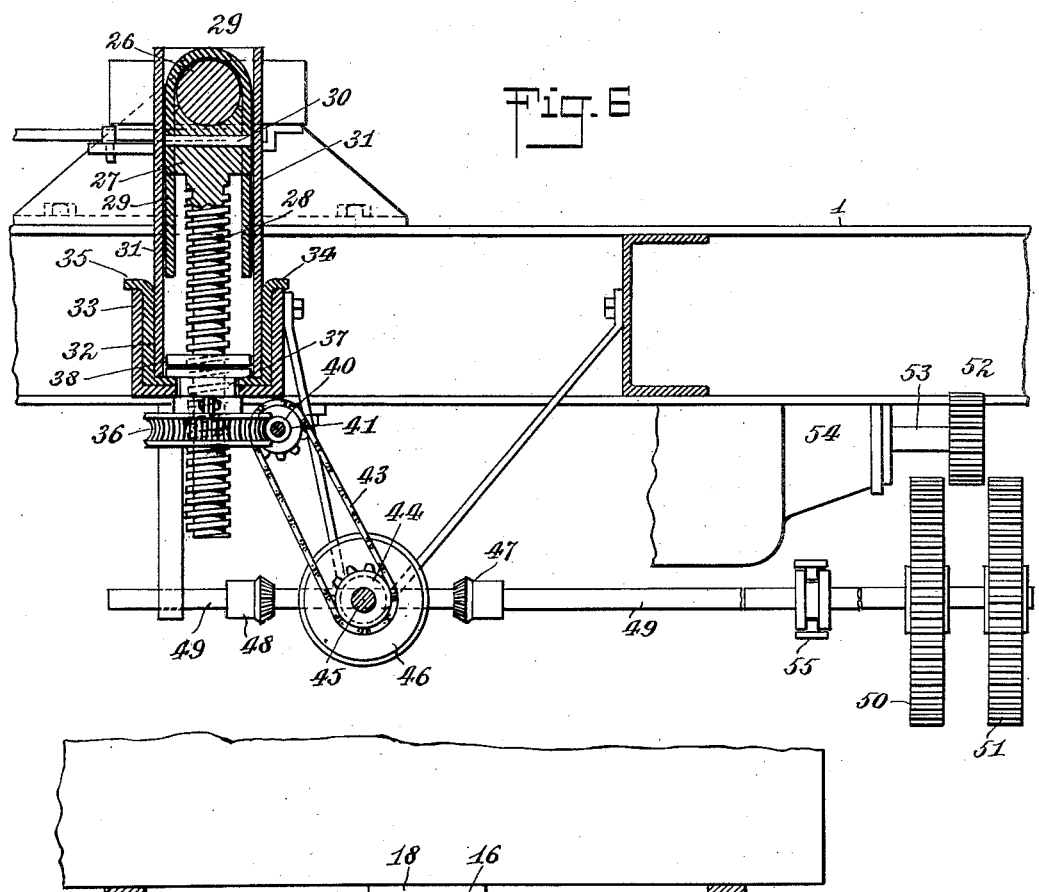
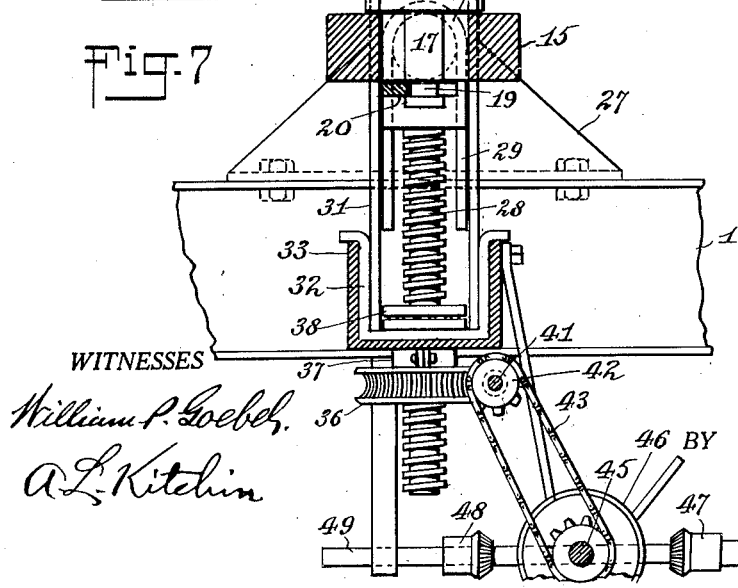

Patented Aug. 18, 1925.

1,550,555

UNITED STATES PATENT OFFICE.

WILLIAM MAYER, OF BROOKLYN, NEW YORK.

TRAILER COUPLER.

Application filed January 30, 1924. Serial No. 689,454.

REISSUED

*To all whom it may concern:*

Be it known that I, WILLIAM MAYER, a citizen of the United States, and a resident of the city of New York, borough of Brooklyn, in the county of Kings and State of New York, have invented a new and Improved Trailer Coupler, of which the following is a full, clear, and exact description.

This invention relates to tractors and trailers and particularly to an improved coupling mechanism therefor including power mechanism for causing an actuation of certain of the connecting parts.

An object of the invention is to provide an improved construction wherein means are provided for connecting the engine of the tractor to certain parts of the coupling mechanism for raising the trailer at one end when it is desired to uncouple the same.

Another object is to provide a coupling for tractors and trailers wherein the moving parts may be actuated from the engine of the tractor without stopping the engine.

An additional object is to provide a coupling structure for trailers in which the trailer is raised from power derived from the tractor engine, the same being associated with an adjustable support for the trailer capable of supporting the same after it has been arranged and the tractor removed.

In the accompanying drawings—

Figure 1 is a side view of part of a tractor and trailer, with couplings embodying the invention shown applied thereto.

Figure 2 is a view similar to Figure 1 but showing the trailer elevated with the elevating means moved back to their former position.

Figure 3 is an enlarged fragmentary view of the lower part of the support shown in Figures 1 and 2, illustrating how the pawls thereof may be thrown out of engagement.

Figure 4 is a top plan view of the rear part of the tractor showing part of the coupling mechanism and the king pin of the trailer in section.

Figure 5 is a transverse vertical sectional view through Figure 4, approximately on line 5—5 in Figure 4.

Figure 6 is a longitudinal vertical sectional view through Figure 4, approximately on line 6—6 in Figure 4.

Figure 7 is a fragmentary longitudinal sectional view through Figure 4, approximately on line 7—7 in Figure 4.

Referring to the accompanying drawings by numerals, 1 indicates a tractor of any desired kind and 2 a trailer adapted to be connected to the tractor 1 and disconnected therefrom whenever desired. The particular construction of the tractor 1 and the trailer 2 forms no part of the present invention but only the coupling and associated structures.

As indicated in Figure 1, a standard 3 is provided pivotally mounted at 4 to the trailer 2 and acting to support the trailer as indicated in Figure 2 when the tractor 1 is moved away. The standard 3 is provided with a bar 5 swingingly supported at 4 and provided with oppositely extending ratchet teeth 6 for receiving the respective pawls 7 and 8. These pawls are carried by a base 9 into which the lower end of the rod 5 extends. The pawls 7 and 8 have suitable pivotal supports which extend to the exterior of the base 9 and connected to these pivotal supports are arms 10 and 11 connected by a link 12 (Figure 3), whereby upon the actuation of the crank member 13 secured to arm 10, both pawls may be thrown into and out of operation at any time.

When the trailer is being pulled by the tractor 1, the standard 3 is arranged as shown in dotted lines in Figure 1 and supported by a suitable hook 14 or other suitable supporting members. When it is desired to lift the trailer at a given point and move the tractor away, the standard 3 is swung down to the full line position shown in Figure 1 and then the parts actuated as hereinafter fully described for elevating the trailer 2 as shown in Figure 2 whereupon the tractor 1 may be readily moved away.

In order to raise the front of the trailer 2 as shown in Figure 2 and to lower the same, special mechanism is provided on the tractor 1 which is adapted to be actuated in both directions by the engine of the tractor. In Figure 4, will be seen a top plan view of the rear part of the tractor from which it will be seen that a bolster 15 is provided which extends from near one side to near the opposite side of the tractor and which is flat but rounded at each end and enlarged or swelled outwardly horizontally in the center. A suitable aperture 16 is provided in the center of the bolster 15 as shown in Figure 5, said aperture being adapted to receive the coupling pin or king pin 17, preferably formed integral with the plate 18, which plate is bolted or otherwise rigidly secured to the bottom of the trailer 2. When the pin 17 is in the position shown in Figure 5, the trailer and tractor are coupled together. From Figure 7, it will be noted that the pin 17 is provided with a groove 19 for receiving a locking yoke 20, which yoke may be formed integral with the arm 21 or may be mounted in some other manner whereby it can be moved into and out of engagement with the pin 17. A hand lever 22 is rigidly secured to or formed integral with the arm 21 and a suitable pivotal pin 23 extends through the juncture of the arm 21 and lever 22, said pin extending into the bolster 15. A plate 24 is bolted or otherwise rigidly secured to the bolster 15 and extends at right angles thereto for a short distance as shown in Figure 4, in order to receive the removable pin 25.

When the parts are in the position shown in Figure 4, the yoke 20 is positioned in the groove 19 and, consequently, the coupling pin 17 is locked against disengagement. When it is desired to disengage the coupling pin, the pin 25 is removed and the lever 22 may be moved over to the dotted position shown in Figure 4 and pin 25 re-inserted whereupon yoke 20 will be locked in an outer position.

As both sides of the device are identical, the description of one will apply to both. As indicated particularly in Figures 5 and 6, the ends of the bolster 15 are provided with rounded sections 26 which rest in a suitable head 27 merging into a threaded vertical screw 28. A binding or retaining strap 29 of sheet metal is mounted over the rounded portion 26 and is secured to the head 27 by a suitable pin 30. The head 27 with its strap 29, is mounted to reciprocate in a vertical guide 31 which is U-shaped in cross section, with the open part of the structure facing inwardly. In other words, a deep channel iron is used for forming the guide 31, said channel iron being secured by welding or otherwise to the socket member 32 which in turn is mounted on the transverse U-shaped channel 33 forming part of the tractor frame. The socket member 32 may be secured in place in any desired manner but ordinarily it may be retained in place by friction and said socket member having outwardly turned flanges 34 and 35 at the top so as to distribute the strain over all parts of the channel iron 33 at the end thereof. The screw 28 extends through the socket member 32 and also the channel iron 33 as indicated in Figures 5 and 6 and through the worm gear 36, which gear is provided preferably with an elongated shank 37, internally threaded for receiving the screw 28. The shank 37 is preferably provided with a flange 38 so as to receive suitable anti-friction bearings 39, said bearings being mounted in any desired manner on the channel iron 33. The worm gear 36 continually meshes with the worm 40 secured to the shaft 41 whereby whenever the shaft 41 is rotated, the worm gear will be rotated and, consequently, the screw 28 will be raised or lowered according to the direction of rotation of the various parts. As the duplicate of this same structure is on the opposite side and operated by the same shaft 41, the bolster 15 will be raised and lowered as the case may be.

In order to secure a proper drive for the shaft 41 and associated parts, the said shaft is provided with a sprocket wheel 42 for accommodating the chain 43, which chain passes over a sprocket wheel 44 rigidly secured to the shaft 45. The shaft 45 is mounted in suitable bearings connected with the various parts of the tractor and has a bevel gear 46 rigidly secured thereto near one end. This bevel gear co-acts with the bevel pinions 47 and 48, which pinions are moved into mesh with the bevel gear whenever it is desired to raise or lower the bolster 15. The pinions 47 and 48 are rigidly secured to a shaft 49 supported by suitable bearings which will permit the shaft to freely rotate and also freely reciprocate. This shaft near the front is provided with a pair of gear wheels 50 and 51, said gear wheels being spaced a short distance apart and capable at different times of meshing with the driving pinion 52 secured to the shaft 53 extending from the transmission 54 or connected to the propeller shaft of the engine where there is no power take-off shaft in the transmission. The transmission 54 is of any usual or preferred type used on tractors and, therefore, will not need a detail description.

The shaft 49 is reciprocated by any suitable means, as for instance, a hand lever 55, said lever extending either to the driver's seat or to some other convenient point. When the tractor is operating to pull the trailer, the gear wheels 50 and 51 are in the position shown in Figure 6. If it should be desired to remove the trailer from the tractor, the shaft 49 is shifted until the gear wheel 51 fully meshes with the pinion 52. When this occurs, the bevel pinion 47 will be in mesh with the bevel gear 46. The tractor engine is preferably operating before or at the time this takes place but the clutch is released which naturally stops the gear 52 to permit the ready engagement of the gear wheel 51. After the gear wheel 51 has been properly brought into mesh, the clutch is again thrown in so that the shaft 45 will immediately begin to rotate which will transmit power to the shaft 41 and from thence to the worm 40 and worm gear 36 co-acting with the respective screws 28 for raising the bolster 15 and associated parts.

Before this raising action has taken place, it will be necessary to shift the lever 22 to the dotted position shown in Figure 4 in order to release the pin 17. When this has been done and the bolster 15 has been raised to substantially the position shown in Figure 2, the shaft 49 and associated parts are moved back to the position shown in Figure 6 but the engine of the tractor is not stopped. When this has been done, the operator assures himself that the standard 3 has properly functioned and drives the tractor away to the desired point. Preferably, before the tractor is driven away, the bolster 15 and associated parts are lowered to their former position. To do this, the clutch is again released and the shaft 49 moved in a reverse direction a sufficient distance to cause the gear wheel 50 (Figure 6) to mesh with pinion 52 and the bevel pinion 48 to mesh with the bevel gear 46. After this shifting of gears has taken place, the clutch is again operated and the parts will be actuated whereupon the worm wheel 36 and asociated parts will be actuated for moving the bolster 15 downwardly to its former position, namely, the position shown in Figure 5. The clutch is again released and shaft 26 moved until the parts are moved to a neutral position as shown in Figure 6. The clutch may be again let in and the tractor started in the usual way.

When it is again desired to connect the tractor to the trailer, the tractor is backed into position, as for instance, into the position shown in Figure 2 and lever 55 is again shifted for causing the gear 51 to mesh with the pinion 52. This will cause the bolster 15 to become elevated and the elevation is continued until the pin 17 is in the position shown in Figure 5 and in fact, until the forward end of the trailer 2 has been lifted slightly. When this has occurred, the parts are moved to the neutral position shown in Figure 6 and the standard 3 is manually shifted to the position shown in dotted lines in Figure 1. The shaft 49 is again operated to move the gear wheel 50 into mesh with the pinion 52 in order to cause the parts to be actuated for again lowering the bolster 15 to substantially the position shown in Figure 5. When it has reached this position, the parts are again moved to the neutral position shown in Figure 6 and the trailer and tractor are coupled, ready for use together.

What I claim is:

1. A coupling for trailers and tractors, comprising a coupling pin adapted to be connected with the trailer, a bolster adapted to be mounted on the tractor, said bolster having an aperture through which said pin is adapted to extend, a pair of reciprocating members for raising and lowering said bolster, said reciprocating members being threaded at their lower ends, means for guiding said reciprocating members and said bolster in their movement, a worm gear provided with a threaded bore for receiving each of said threaded members, a worm meshing with each of said worm gears, a shaft connecting said worms whereby they will be operated simultaneously and means connected with said shaft for actuating said shaft and gear wheels to actuate said reciprocating members.

2. In a coupling for tractors and trailers, a coupling pin adapted to be connected with the trailer, a bolster having an aperture, said bolster being mounted on said tractor, means for moving said bolster into and out of engagement with said pin, said means including a plurality of threaded rods arranged vertically, a gear wheel threaded onto each of the threaded rods, a co-acting gear for each of the gear wheels for actuating the same, said first mentioned gear wheels being fixed whereby as they are rotated the threaded members and bolster will be raised and lowered according to the direction of rotation, a shaft for rotating said co-acting gears, and a plurality of means for connecting said shaft with the engine of the tractor, said plurality of means including a hand operated member for causing a connection and disconnection with said engine and a reversal of said gears according to the direction of movement of said hand operated member.

3. In a coupling for trailers and tractors, a coupling pin projecting from the trailer, a vertically movable bolster for receiving said coupling pin, said bolster being mounted on a tractor, means for connecting the engine of the tractor with the bolster for causing the bolster to be moved upwardly and downwardly, said means including a reciprocating shaft, manually actuated means for reciprocating said shaft, a pinion connected with said engine, a pair of gear wheels mounted rigidly on said shaft and spaced apart a proper distance so that when said shaft is moved in one direction to its extreme position, one of the gear wheels will mesh with said pinion and when moved to its opposite extreme position, the other of the gear wheels will be in mesh with said pinion, a pair of bevel pinions mounted on said shaft and spaced apart, a bevel gear adapted to mesh at different times with said pinions, said bevel pinions being spaced apart a proper distance to be moved into engagement with said bevel gear when said shaft is moved to its respective extreme positions, a pair of threaded members connected with said bolster, a fixed worm gear threaded onto said threaded members, and means for driving said worm gears from said bevel gear.

4. A trailer coupling, comprising a coupling pin adapted to be connected with a trailer, a bolster adapted to be mounted on a tractor and formed with an opening for receiving said pin, means on the tractor for raising and lowering said bolster into and out of engagement with said coupling pin, said means being operatively connected with the engine of the tractor whereby the engine of the tractor will raise and lower the bolster, manually shiftable means for connecting and disconnecting the engine from the raising and lowering means, and manually shiftable means carried by the bolster for locking said pin in engagement with the bolster when the parts are in coupling position.

5. In a coupling for trailers and tractors, a coupling pin projecting from the trailer, a vertically movable bolster for receiving said coupling pin, said bolster being mounted on a tractor, means for connecting the engine of the tractor with the bolster for causing the bolster to be moved upwardly and downwardly, said means including a reciprocating shaft, manually actuated means for reciprocating said shaft, a pinion connected with said engine, a pair of gear wheels mounted rigidly on said shaft and spaced apart a proper distance so that when said shaft is moved in one direction to its extreme position, one of the gear wheels will mesh with said pinion and when moved to its opposite extreme position, the other of the gear wheels will be in mesh with said pinion, a pair of bevel pinions mounted on said shaft and spaced apart, a bevel gear adapted to mesh at different times with said pinions, said bevel pinions being spaced apart a proper distance to be moved into engagement with said bevel gear when said shaft is moved to its respective extreme positions, and means for driving said worm gears from said bevel gear.

WILLIAM MAYER.